Patented Sept. 19, 1950

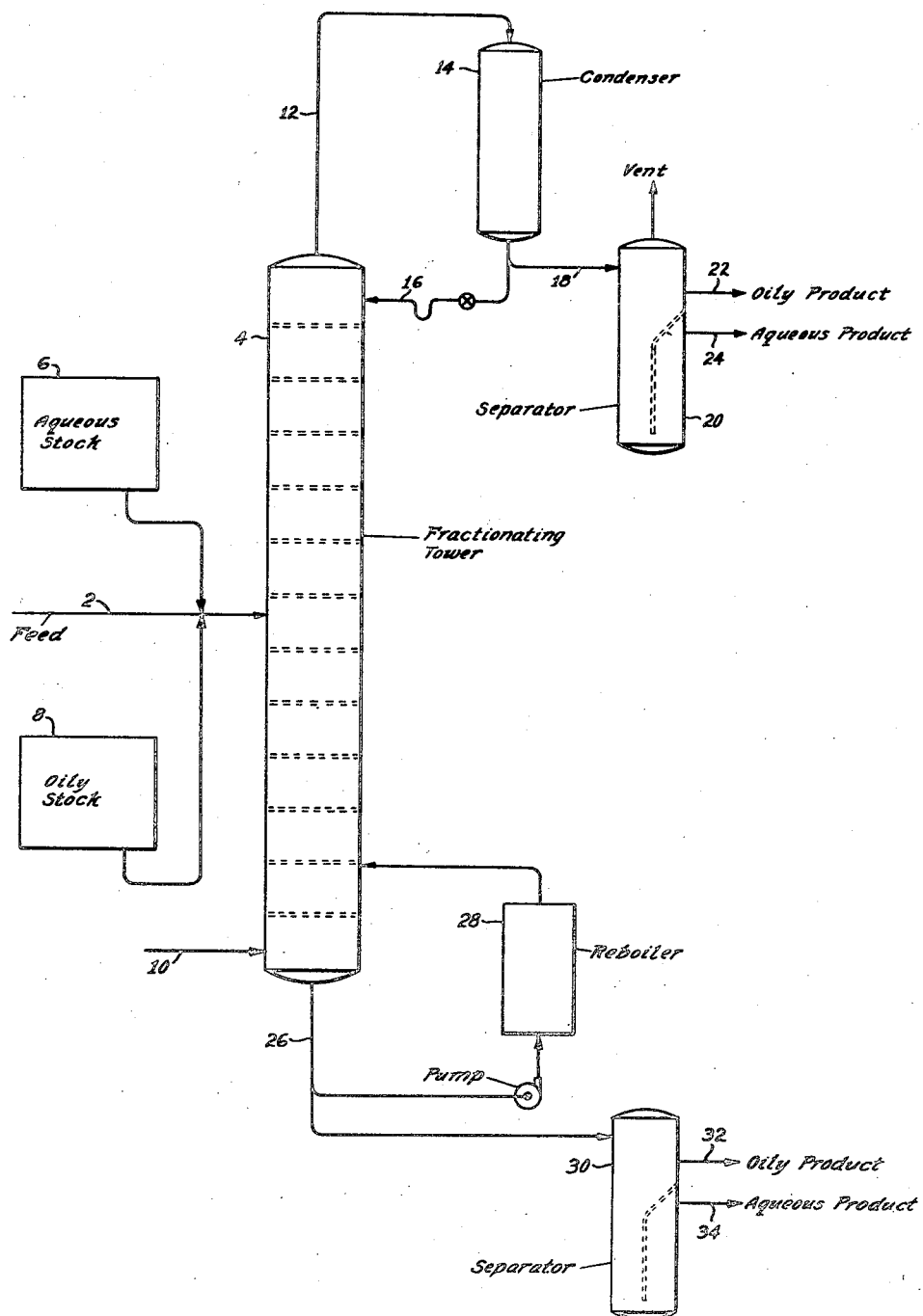

2,523,248

UNITED STATES PATENT OFFICE 2,523,248

SEPARATION OF ALCOHOLS AND ACIDS FROM FISCHER-TROPSCH SYNTHESIS PRODUCT

Bennie Heinze and Jack A. King, Pawhuska, Okla., assignors to Cities Service Oil Company, Bartlesville, Okla., a corporation of Delaware Application February 19, 1948, Serial No. 9,428

10 Claims. (Cl. 202—42)

Our invention relates to improvements in the processing of the oily and aqueous products synthesized by processes of the type of the Fischer-Tropsch (Synthol or Synthine) process for the separation of alcohols from acids present in the products. In a more particular sense, our invention is directed to the joint processing of such oily and aqueous products to facilitate the separation of alcohols from organic acids.

In the so-called hydrocarbon Synthol process of the type generally known as the Fischer-Tropsch synthesis, the products are generally obtained as oily and aqueous fractions. When such processes are carried out under conditions and with catalysts which are productive of substantial proportions of oxygenated organic compounds, such as acids and alcohols, the products are of considerable value in addition to the hydrocarbon content, but the recovery of alcohols and acids from such products has presented problems of considerable importance.

Heretofore, the products have been processed for the recovery of acids and alcohols by separately treating the aqueous fraction from the oily fraction. We find that the handling of the fractions separately in this manner has several disadvantages. In the first place, the aqueous and oily fractions require separate sets of equipment so that there is substantially duplication of equipment cost as well as a duplication in the cost of processing. In the second place, we have noted that in such separate operations there is a considerable loss of acids and alcohols, apparently caused by esterification during the processing operations. This esterification has been particularly noticeable in the handling of the oily fraction in an attempt to separate the acids from the alcohols. Since this operation is carried on under nearly anhydrous conditions, it is often found that from 40 to 60 per cent or more of the original acid and alcohol content has been converted to esters by reaction with the congeneric alcohols present in the oily fraction.

The primary object therefore of our invention is to provide an improved process for handling synthetic product fractions of the type referred to under conditions which will avoid the difficulties and disadvantages pointed out above.

A further object of our invention is to provide an improved process by which the synthesized alcohols and acids contained in the synthetic fractions may be recovered without appreciable losses.

Another object of our invention is to provide an improved process for jointly treating the oily and aqueous fractions produced synthetically by processes of the type known as Fischer-Tropsch and similar processes.

An important feature of our invention is the discovery that the high losses normally incurred in the processing of synthetic products of the type referred to may be avoided by the joint simultaneous processing of the aqueous and oily fractions. Accordingly, we either take the entire production as it comes from the synthesis or we combine the aqueous and oily fractions of such a synthesis and subject them to simultaneous fractionation in a fractionating tower, without neutralizing the acids, under conditions which are controlled so as to take overhead a fraction which includes substantially all of the alcohols, and to produce a bottoms product which contains substantially all of the organic acids present in the original material.

We have found that if the oily and aqueous fractions are thus processed, particularly to temperatures of from about 80° to 95° C., we avoid appreciable esterification and loss of alcohols and acids.

In carrying out our process we take the oily and aqueous fractions and mix them, if they have been separated out, or take the production mixture directly from the plant and charge it to a fractionating tower where the mixture is fractionated to take overhead oil and water, together with oil and water soluble oxygenated compounds, principally alcohols. We also produce a bottoms product comprising oily constituents, water and oil and water soluble oxygenated compounds, principally organic acids. We have found that the fractionation, if conducted at a suitable controlled temperature, effectively separates the alcohols from the organic acids so that essentially all the alcohols go overhead while the acids are retained in the bottoms product.

We have also found that this fractionation produces an overhead oily product comprising the lighter hydrocarbon constituents which is readily amenable to solvent extraction with selected alcohol solvents, such as aqueous alcohol solutions, for the recovery of the lower molecular weight oxygenated hydrocarbons dissolved therein. Likewise, the bottoms oil fraction, now essentially free of alcohols, has a lower solvent power for organic acids, and more particularly has a low solvent power for the sodium salts of the acids when the bottoms oil fraction is neutralized with an alkaline solution. We have also found another advantage; the bottoms oil fraction, as distinguished from the total oil fraction, does not readily dissolve or retain soaps and other alkali containng materials when neutralized.

Another advantage of the process of our invention is a minimal presence of esters in the oily products, which in the past have materially complicated the treatment and purification of Synthol-produced oxygenated hydrocarbon compounds.

Our improved process includes other features, objects, and advantages which will be pointed out hereinafter in connection with certain specific examples, the process being described in general in connection with the accompanying drawing which forms a part of this application.

The drawing comprises a single figure showing diagrammatically and in elevation an apparatus arranged in flow sheet form suitable for carrying out our improved process.

Referring to the drawing, the mixture of oily and water soluble products and water from the Synthol process, for example, a mixture containing about 30 per cent of hydrocarbons from $C_4$ up to $C_{10}$ or $C_{12}$, is conducted directly through a line 2 to the midportion of a fractionating tower 4. Where the production from the synthesis has been separated into oily and aqueous fractions, the aqueous fraction is taken from a supply tank 6 and the oily fraction, comprising, for example, 70 per cent hydrocarbons, is taken from a supply tank 8, and both fed into the line 2 and the tower 4 in approximately the proportions recovered from the synthesis. In either case the mixture, which includes considerable water, is introduced into the tower 4 and subjected to a fractionating operation, by the introduction of steam through a line 10. The vapors produced in the tower, comprising a mixture of water, hydrocarbons, other oily products and alcohols, are conducted overhead through a vapor line 12, condensed in a condenser 14, and the resulting product is discharged therefrom so as to send a controlled proportion through a valved reflux line 16 back into the top of the tower 4, while the remainder is conducted through a line 18 into a separator 20. Any gas present in the system is vented from the separator 20 while the oily and aqueous fractions, which separate by gravity, are removed respectively through lines 22 and 24.

The bottoms produced by the tower 4 are withdrawn through a line 26 and a proportion thereof recirculated through a reboiler or heater 28 and reintroduced into the lower portion of the tower 4. The remainder of the bottoms in the line 26 passes into a separator 30 from which the separated oily and aqueous fractions are removed through lines 32 and 34, respectively. The reboiler 28 may be used for maintaining and controlling the temperature in the tower, and the materials passing through the heater 28 may be heated by any suitable means not shown.

While we prefer to process the normal entire Synthol production in the tower 4, it will be understood that this production may vary considerably in its water content and that in extreme situations the product may be comprised largely of hydrocarbons with some alcohols and acids dissolved therein. In such cases, the fractionation in the tower 4 is advantageously carried out by either introducing water with the charge in the line 2 or by introducing steam through the line 10. Direct steam may be used for heating the tower in any case.

In carrying out our process, we advantageously effect a rapid distillation in the tower 4 so as to take overhead approximately 50 per cent of the oily material and approximately 20 per cent of the water and water soluble materials introduced through the line 2, although the distillation may be so controlled as to take over lower or higher percentages. The tower 4 is controlled so that it has a top temperature in the range of from 80° C. up to about 95° C., depending somewhat upon the difference in boiling points between the alcohols or alcohol-water-hydrocarbon azeotropes, and the acids or acid-water-hydrocarbon azeotropes. We have found that the tower 4 can be controlled so that the overhead product contains a concentration of the alcohols present in the original mixture, while the bottoms product comprises a concentration of substantially all of the acids originally present. The distilling operation may be conducted as a continuous process or as a batch fractionation in which the cut temperature rises to a final point.

It is to be understood, of course, that a relatively efficient tower is used and that the reflux ratio will preferably be controlled between about 2:1 and 6:1, although a reflux ratio as low as 0.2:1 has been used successfully, which together with the temperature control referred to gives a substantially complete separation of alcohols and acids. In general, we find that 90 per cent or more of the original alcohol content is recovered in the overhead products without more than about 2 per cent of the acids originally present. We have also found that 95 per cent or more of the original acids present in the charging stock are recovered in the tower bottoms, and that in some cases the recovery is as high as 96 to 97 per cent.

The organic acids present in the aqueous solution withdrawn through the line 34 may be recovered in any suitable manner as, for example, by dehydration and fractional distillation or by solvent extraction with subsequent distillation from the selective solvent. The oily fraction withdrawn through the line 32 contains essentially all of the higher fatty acids as, for example above $C_4$, a small percentage of the higher esters and alcohols, above $C_6$, produced in the synthesis. The higher fatty acids are, in general, of considerable value so that the chemical and physical steps necessary for their recovery is generally justified. The division of the acids in the foregoing manner facilitates acid recovery and provides fractions which are economically processed for acid recovery and purification.

The following examples illustrate various features of our process, and the results obtained demonstrate the efficiency with which the acids and alcohols are separated. It is to be understood, however, that these examples are illustrative only and do not constitute a limitation upon the process.

*Example 1*

A charging stock consisting of 17,100 parts by volume consisting of Synthol oil and water solutions in the ratio of 100:128, was subjected to fractionation in a 4 foot vacuum jacketed column one inch in diameter packed with Fenske glass helices. The fractionation was carried out batchwise at a reflux ratio of approximately 3:1, and continued until the temperature at the top of the column reached 95° C. The overhead distillate, as well as the distillation bottoms, were separated into oil and water layers comprising, respectively, 23.1, 9.0, 21.1, and 45.3 per cent by volume of the original charge.

Esterification was negligible in the operation as shown by the fact that over 99 per cent of the alcohols and over 99 per cent of the acids present in the original charge were accounted for in the distillation products. The alcohols in the original products were divided 75.6 mol per cent in the water solution and 24.4 mol per cent in the oil solution, while the acids were divided, respectively, 62.3 and 37.7 mol per cent.

Of the original alcohols present in the charging stock, 92.3 mol per cent were recovered in the overhead products, divided 62.3 mol per cent in the water layer and 30 mol per cent in the oil layer, these layers also contained, respectively, 0.9 and 1.3 mol per cent of the original acids.

The distillation bottoms contained 7.1 mol per cent of the alcohols, all in the oil layer, while the water layer contained 69.5, and the oil layer 27.8 mol per cent of the original acid content of the charging stock.

These figures show, as pointed out above, that 99.4 mol per cent of the alcohol content of the charge were accounted for, largely in the overhead distillate, while 99.5 mol per cent of the original acids were accounted for, all but 2.2 mol per cent being in the distillation bottoms.

Example 2

Another operation was carried out similar to that of Example 1 in the same column except that the fraction was carried to a top cut temperature of 97° C. The charging stock had the same composition as that shown in Example 1 and comprised 44 parts by volume of Synthol process oil solution and 56 parts by volume of Synthol process water solution. The products were separated into oil and water layers as in Example 1, the distillate oil and water layers comprising, respectively, 24.9 and 10.0 per cent or 34.9 per cent, and the bottoms oil and water layers comprising, respectively, 19.1 and 44.9 per cent or 64 per cent by volume of the charge, a 97.9 per cent overall recovery.

Having in mind the division of alcohols and acids in the charging stock of Example 1, the overhead distillate in this example contained 97.5 mol per cent of the original alcohol content of the stock, divided 58.2 mol per cent in the water layer and 39.3 mol per cent in the oil layer. Of the acids present originally in the charging stock, the overhead distillate contained only 2.2 mol per cent, divided 0.6 mol per cent in the water layer and 1.6 mol per cent in the oil layer.

The distillation bottoms contained 2.3 mol per cent of the original alcohol content of the stock, all in the oil layer, while the bottoms also contained 96.7 mol per cent of the acids present in the stock, divided 71.5 mol per cent in the water layer and 25.2 mol per cent in the oil layer.

The foregoing figures show the extremely low content of acids in the overhead distillate products and a correspondingly low content of alcohols in the distillation bottoms, even though the temperature in the tower was carried up to 97° C., which is a relatively high temperature for the products being treated.

Our determinations that the distillation bottoms water layer contained negligible proportions of alcohols, as shown above, was verified by neutralizing a portion of this water layer and then distilling it to take over approximately 85 per cent of the total sample. Freezing point determinations on this condensate showed impurities of only 0.42 per cent. It is apparent therefore that the aqueous bottoms layer is practically free of alcohols.

We advantageously carry out our process in an efficient fractionating tower and at a favorable reflux ratio in order to effectively separate the alcohols from the acids. We have found that if the overhead temperature is maintained somewhat lower than the final temperature given in the above examples, the overhead products will be more free of acids. In general, we have found that considerably over 90 per cent of the alcohols will be in the overhead product if the cut temperature is as low as 83° C. With respect to the carryover of acids into the overhead products, we prefer to carry out our process so that generally 1.0 mol per cent or less is taken overhead. This percentage is influenced to a considerable extent by the reflux ratio, but it is to be expected that the higher the cut temperature on the tower, other things remaining equal, the greater the proportion of acids taken overhead, particularly after the temperature reaches a point of about 87° C.

From the standpoint of alcohol recovery, we prefer to operate at a relatively high cut temperature on the tower and to maintain the reflux ratio at a relatively high point. The following table shows the effect of different reflux ratios and temperatures on the recovery of alcohols and the carry-over of acids in the overhead distillate products when the distillation is carried on in a continuous manner.

TABLE 1

*Continuous joint distillation of Synthol type process oil and water with varying reflux ratios and top column temperatures*

| Top Temp., °C. | Reflux Ratio | Mol Per Cent of acids in distillate | Mol Per Cent of alcohols in distillate |
|---|---|---|---|
| 81.6 | 4:1 | 0.0 | 87.5 |
| 84.4 | 2:1 | 1.0 | 92.0 |
| 84.7 | 7:3 | 1.2 | 93.8 |
| 85.9 | 2:1 | 4.1 | 94.5 |
| 89.5 | 4:1 | 6.8 | 94.5 |

The quantity of acids in the overhead product may be used as the control factor in the fractionating operation. We have generally operated to recover at least 90 per cent of the original alcohols present in the oil and water process products in the overhead distillate with less than 10 and preferably not more than 2 mol per cent of the original acids. As has been shown above in Example 2, we have recovered 97.5 per cent of the original alcohols in the overhead product with about 2.2 per cent of acids. Similarly, the distillation system has been operated for the essentially complete recovery of acids in the distillation bottoms. We have generally operated to recover 95 per cent or more of the acids present in the process products, and recoveries of the order of 96 and 97 per cent or more of the original acids have been obtained by the selection of operating conditions within the scope of our disclosure.

The small proportion of acids taken overhead may be recovered if the practical value of these products justifies the chemical and/or physical treatment involved. The total overhead products containing a minor quantity of acids may be neutralized to form the salts of the acids and then distilled to obtain oily or aqueous acid-free distillates. The residual acids may then be recovered by acidification and distillation. When the practical value of the acids present in the overhead product is small, their recovery may not be justified. Under these conditions the distillation system would probably be operated to give an economic minimum of acids in the overhead products. We have generally been able to effect an efficient separation of alcohols and acids with about 2 per cent or less of the acids in the overhead products by carrying out the continuous distillation at a top column temperature of 85° C. or less and at a reflux ratio of 2:1 or higher.

Modifications in our proposed distillation system may be made to effect certain results in addition to those heretofore disclosed. For example, on jointly distilling the oil and water process products to approximately 80° C. the overhead oil and water products comprised approximately 60 to 65% by volume of the distillate products otherwise recovered when distilling to about 95° C. top column temperature. We have found that the aqueous layer in this first overhead product is essentially acid-free and particularly rich in lower aliphatic alcohols, and that the oily layer recovered therewith is readily extractable with water alone to recover additional quantities of dissolved alcohols, whereas the oily product obtained on distilling to a higher top temperature, of the order of 95° C., generally requires organic solvents such as concentrated alcoholic or glycol solutions to effect extraction of oxygenated chemicals.

A further distillation of the oil and water charge stock beyond this preliminary 80° C. cut point may be carried out to a temperature of the order of 90 to 98° C., such as has generally been used in the one-step fractionation. In this second distillation the overhead fraction products are relatively rich in oil and relatively poor in water with the water layer comprising a fairly weak organic solution. The aqueous product from this second cut may be utilized advantageously in extracting the hydrocarbon fraction obtained in the first overhead cut to about 80° C. to recover the water soluble alcohols contained in the first oily fraction. This weak aqueous solution is thereby enriched with extracted alcohols from the lower temperature hydrocarbon fraction and may then be advantageously combined with the first cut aqueous product rich in lower aliphatic alcohols. The resulting aqueous solution containing essentially all the alcohols present in the distillate to 80° C. may then be processed for its alcohols and other organics. By this modification in operations, the overall volume of the overhead aqueous fraction is about the same but its content of organics is higher than when otherwise obtained. In this modified operation only the second or heavy distillate oil fraction need be extracted with additional solvents for the recovery of oxygenated chemicals. Thus the total hydrocarbon fraction may have a larger proportion of the oxygenated chemicals extracted at a lower processing and solvents cost than have been effective heretofore. The hydrocarbon product is thereby also cleaner and more readily blendable as a motor fuel component.

One of the important advantages of our improved distillation process for the joint handling of oily and aqueous fractions containing acids and alcohols is the carrying out of the distillation in such a way as to avoid the appreciable formation of organic esters. This not only results in an improved recovery of the organic acids and alcohols but facilitates their separation and thereby greatly aids subsequent processing and purification. The improved process is carried out without extracting any of the organic compounds from either the aqueous or oily stocks, and without converting the acids to salts prior to distillation. The examples given above show the relatively low losses of alcohols and acids as compared with losses from 15 to 60 per cent occurring in known prior processes.

Another advantage of separating acids as completely as possible from the alcohols is the fact that the alcohols and other overhead products may be subsequently processed without taking into account the possible corrision which might occur if substantial proportions of organic acids were present.

From the foregoing description of our invention, it will be understood that various modifications may be made without materially changing the results obtained or the advantages incident to carrying out the process. Such modifications are contemplated as coming within the spirit and scope of the invention as defined by the appended claims.

What we claim as new is:

1. In the processing of synthetically produced aqueous and oily hydrocarbon fractions containing organic acids and alcohols, the improvement which comprises subjecting the oily and aqueous fractions of a Fischer-Tropsch synthesis product to joint distillation in a fractionating tower without neutralizing the acids present in the fractions, controlling the fractionation in the tower and taking overhead a vapor product comprising water and oily hydrocarbon constituents as well as substantially all of the alcohols present in the original fractions, and recovering a bottoms product from the tower comprising water and oily hydrocarbon constituents containing substantially all of the organic acids present in the original fractions.

2. The process as defined by claim 1 in which the cut temperature on the tower is maintained at a point below the boiling point of any organic acid azeotropes present or producible in the tower.

3. The process as defined by claim 1 in which the distillation in the tower is controlled to provide a final cut temperature of from about 90 to 97° C., and carrying out the distillation in the tower as a batch operation.

4. The process as defined by claim 1 in which the fractionation in the tower is carried out as a continuous operation by the continuous introduction of charging stock fractions and the continuous removal of overhead and bottoms products, and maintaining a cut temperature on the tower of from about 80° C. to about 90° C.

5. The process as defined by claim 1 in which the fractionation is controlled in the tower to produce an overhead product containing at least 90 mol per cent of all of the alcohols present in the fractions charged to the tower and to produce a bottoms product containing at least 90 mol per cent of all the acids charged to the tower.

6. The process as defined by claim 1 in which the fractionation is controlled in accordance with the organic acid content of the overhead products, and maintaining the cut temperature on the tower at a point sufficiently low to avoid taking overhead more than about 5 mol per cent of the acid content of the charging stock.

7. In the processing of synthetically produced organic materials including hydrocarbons, organic acids and alcohols, the improvement which comprises subjecting a charging stock consisting of a Fischer-Tropsch synthesis product containing substantial proportions of such constituents and water to a fractional distilling operation in a fractionating tower, controlling the fractionating operation in the tower so as to maintain a cut temperature on the tower of from approximately 80° to 95° C., removing overhead from the tower a product fraction comprising hydrocarbons, water and substantially all of the alcohol content of the charging stock and removing a bottoms product from the tower comprising hydrocarbons, water and substantially all of the organic acids content of the charging stock to the tower.

8. The process as defined by claim 7 in which the fractionation in the tower is controlled by refluxing overhead products back to the tower at a reflux ratio above 0.2:1.0.

9. The process as defined by claim 7 in which the fractional distillation carried on in the tower is a continuous distillation in which charging stock is continuously fed to the tower at an intermediate point and regulating the cut temperature on the tower to maintain it between about 80° and 90° C.

10. In the processing of synthetically produced organic materials including hydrocarbons, organic acids, and alcohols, the improvement which comprises subjecting a charging stock consisting of a Fischer-Tropsch synthesis product containing such constituents and water to a fractional distilling operation in a fractionating tower, removing overhead from the tower an essentially acid-free product fraction at about 80° C. comprising hydrocarbons, water, and alcohols, removing overhead from the tower a second product fraction at about 90° to about 95° C. relatively rich in hydrocarbons and relatively poor in water, separating the hydrocarbon layer from the water layer of the second product fraction, separating the hydrocarbon layer from the water layer of the first product fraction, extracting the hydrocarbon layer of the first product fraction with the water layer of the second product fraction, combining the water layers of both fractions for further processing, and removing from the tower a bottoms product comprising hydrocarbons, water, and substantially all of the organic acids content of the charging stock to the tower.

BENNIE HEINZE.
JACK A. KING.

REFERENCES CITED

The following references are of record in the file of this patent:

UNITED STATES PATENTS

| Number | Name | Date |
|---|---|---|
| 1,847,597 | Charles | Mar. 1, 1932 |
| 1,865,887 | Coahran | July 5, 1932 |
| 2,159,984 | Fisher | May 30, 1939 |
| 2,290,483 | Othmer | July 21, 1942 |
| 2,317,758 | Guinot | Apr. 27, 1943 |
| 2,407,920 | Cox | Sept. 17, 1946 |
| 2,412,215 | Guinot | Dec. 10, 1946 |
| 2,423,545 | Aeschbach | July 8, 1947 |
| 2,437,649 | Milner | Mar. 9, 1948 |
| 2,438,300 | Schniepp | Mar. 23, 1948 |
| 2,457,257 | Michael et al. | Dec. 28, 1948 |
| 2,476,788 | White | July 19, 1949 |